United States Patent [19]

Lau

[11] 3,932,151

[45] Jan. 13, 1976

[54] SPRAY BOOTH

[75] Inventor: George W. Lau, Blue Island, Ill.

[73] Assignee: Binks Manufacturing Company, Franklin Park, Ill.

[22] Filed: May 8, 1974

[21] Appl. No.: 467,959

Related U.S. Application Data

[63] Continuation-in-part of Ser. No. 331,505, Feb. 12, 1973, abandoned.

[52] U.S. Cl. .................. 55/229; 55/241; 55/257; 55/259; 55/444; 55/446; 55/465; 261/112; 98/115 SB; 118/326; 118/DIG. 7
[51] Int. Cl.² ............................ B01D 47/00
[58] Field of Search ........... 55/30, 32, 97, 228, 229, 55/240, 241, 257, 259, 321, 325, 440, 442, 443, 444, 446, 464, 473, 524, DIG. 24, 85, 89, 90, 462, 465, 445; 261/112, 108, 109, 110, 111; 98/115 SB; 118/326, 634, DIG. 7

[56] References Cited

UNITED STATES PATENTS

| | | | |
|---|---|---|---|
| 503,133 | 8/1893 | Goetz | 261/111 |
| 1,138,081 | 5/1915 | Carrier | 261/108 |
| 1,749,920 | 3/1930 | Modave | 55/241 X |
| 1,966,280 | 7/1934 | Bingman | 55/259 |
| 2,066,913 | 1/1937 | Schmieg | 118/DIG. 7 |
| 2,086,514 | 7/1937 | Saunders et al. | 55/85 |
| 2,395,960 | 3/1946 | Clark et al. | 55/241 X |
| 2,618,133 | 11/1952 | Kennedy | 55/446 |
| 2,694,466 | 11/1954 | Bingman | 55/228 X |
| 3,353,800 | 11/1967 | Jens | 55/228 |
| 3,440,803 | 4/1909 | Wechselblatt | 261/112 |

FOREIGN PATENTS OR APPLICATIONS

| | | | |
|---|---|---|---|
| 1,192,088 | 10/1959 | France | 55/241 |
| 1,029,777 | 6/1953 | France | 55/444 |
| 7,209 | 5/1900 | United Kingdom | 261/108 |

*Primary Examiner*—Frank W. Lutter
*Assistant Examiner*—David L. Lacey
*Attorney, Agent, or Firm*—Gary, Juettner, Pigott & Cullinan

[57] ABSTRACT

A paint spray booth for removing excess atomized paint from the air in the vicinity of a spray painting operation comprises a spray booth structure having a working or spray painting area, an exhaust chamber and an exhaust stack, which together define an air passage having an inlet at the spray painting area and an outlet at the stack, within which a fan is mounted for drawing air through the inlet and out the outlet at high velocity. A plurality of generally vertical baffles are disposed in the passage between the spray painting area and the exhaust chamber for the purpose of removing overspray or excess atomized paint from the air before it is exhausted out the stack. Mineral oil is continuously flowed over the front surface of the baffles so as to entrain therein paint solids in the air stream, and the oil is received in a reservoir or holding tank wherein the paint solids are allowed to settle, and from which the oil is recirculated for downward flow over the baffles.

13 Claims, 4 Drawing Figures

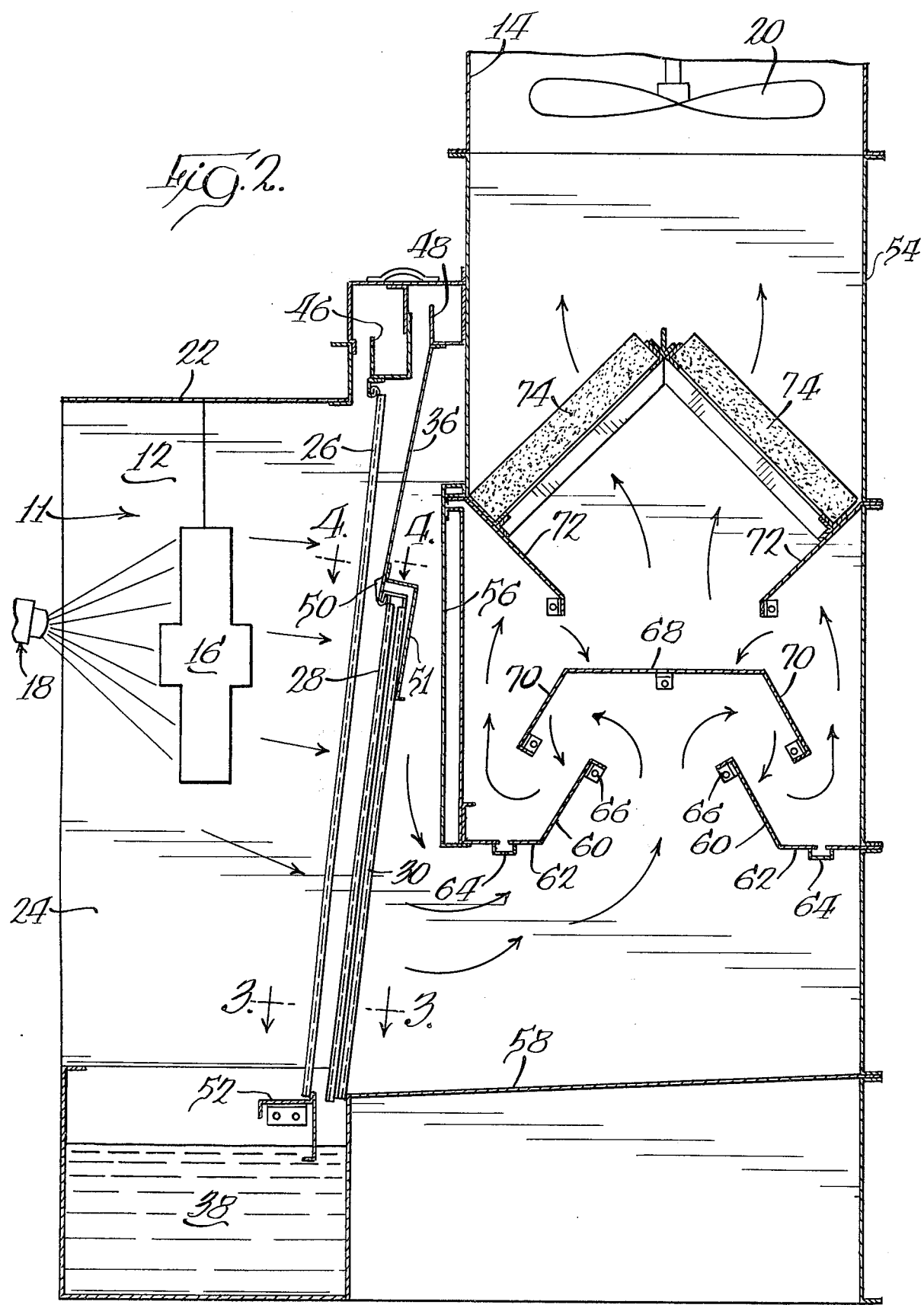

SPRAY BOOTH

Cross Reference

This application is a continuation-in-part of my co-pending application, Ser. No. 331,505, filed Feb. 12, 1973, now abandoned.

Background of the Invention

This invention relates to a method and apparatus for collecting excess paint spray particles in a paint spraying operation.

The term "spray booth" is a term of art generally denoting a large sheet metal structure or housing having a so-called working area or space with which spray painting operations are carried out, an exhaust chamber with an associated stack communicating with the working area, a fan in the stack for drawing fresh air into and through the working area to maintain it well ventilated, and means between the working area and the exhaust chamber for removing paint particles from the air before the air is exhausted up the stack. In essence then, the booth structure defines an air flow passage through which air is moved at high velocity to eliminate mists created by a spray paint operation. Removal of air laden with spray mist and overspray is necessary, among other reasons, to prevent excessive or explosively high concentration of volatile solvents and other flammable materials, to protect personnel in the vicinity from exposure to toxic materials, and to maintain a clean environment for proper finishing of the ware. Current standards require a minimum air flow rate at the face of the booth of 60 cubic feet per minute per square foot, or at least 60 linear feet per minute at each point at the face of the booth for unattended booths, and 100 cfm per square foot or 100 linear feet per minute for attended booths. In order to collect the paint particles and minimize pollution of the atmosphere, especially at the high rates of air flow, the exhaust air laden with spray residue is circulated through an eliminating device or medium, which serves to remove the paint particles before the air is exhausted into the atmosphere.

Eliminating media in current use include the dry baffle system, the dry filter system, and the water wash system. In the dry baffle system, the air is circulated in a tortuous path over solid baffle surfaces disposed between the working area and the exhaust chamber, which causes the paint residue to be deposited thereon. The dry filter system employs filters of a variety of types through which the air is circulated. Both of these dry systems involve frequent cleaning and maintenance problems due to paint accumulation, and also the problem of disposal of waste matter and spent filters as well as presenting a fire hazard.

In the water wash booth, such as that described in the Pearson U.S. Pat. No. 2,545,672, water is caused to flow downward over an imperforate wall at the back of the working area and across an open gap between the bottom of said wall and the liquid level in an underlying water reservoir in the form more or less of a water fall, thereby to form a curtain of descending water against and through which the paint laden air is drawn at high velocity, and whereby the paint is entrained in the water and collected in the reservoir. Principal drawbacks of the water system are that the water must be treated with chemicals to prevent growth of algae and to control the paint collected in the reservoir, and that the waste water is a pollutant. Also, since the area for passage of air into the exhaust chamber is relatively small in comparison with the booth size, and located solely at the bottom regions of the booth, the air flow rate is not uniform within the booth, and a high horsepower fan must be used to maintain the minimum prescribed air flow rate in all areas at the face of the booth. Moreover, the accumulated paint solids cannot be reclaimed and reused and tend to clog the system. Rusting of the booth interior is also a problem, and a severe loss of efficiency in paint removal is experienced if the water curtain is interrupted.

In a development entirely separate from the paint spray booth art, proposals were made during the 1930's to remove dust particles from air by drawing the air at low velocity in a tortuous path through an oil coated baffle system. Representative patents relating to this development include Hines U.S. Pat. No. 1,751,999; Adams et al, U.S. Pat. No. 1,807,950; Gagen U.S. Pat. No. 1,895,619; Dauphinee U.S. Pat. No. 1,899,017; and Weisgerber U.S. Pat. No. 1,083,764. Hines U.S. Pat. No. 1,751,999, for example, discloses a low velocity air filter having a plurality of closely spaced, angularly disposed baffles, together with means to circulate oil over the baffles and through a filter.

Notwithstanding general similarities between the arts of dust particle air filters and spray booths, and a high degree of further development in the art of spray booths since the above development, the use of oil or other viscous liquid as an eliminating medium in a spray booth of the structure hereinafter described has not been developed in the prior art, and the art of air filters has developed separately and independently from the art of spray booths. One fair supposition for this divergence is that the use of oil in a conventional water wash booth would cause contamination of the external atmosphere with oil, due to the high velocity air flow. Conversely, the requirement of a high velocity air flow in a spray booth would be incompatible with the aforesaid air filter devices because large amounts of oil would be stripped off the baffle surfaces, causing such devices to become inoperable.

SUMMARY OF THE INVENTION

In accordance with the present invention, a supported moving film of oil is used as the paint collecting medium in a specially designed paint spray booth. The booth comprises an enclosure having an inlet opening therein through which air is drawn at a high velocity, or in excess of 60 cfm per square foot of opening. Spaced inward from said opening are a plurality of rows of baffles arranged substantially perpendicular to the air flow. The front row of baffles are substantially planar with wide frontal faces, and are closely spaced to define narrow vertical spaces therebetween through which air may pass. A film of oil is continuously flowed over the front surfaces of the baffles in order to entrain therein paint mist carried by the air stream, and the oil is circulated through a reservoir wherein the paint settles and may be removed and reclaimed. Means downstream of the baffles are also provided to remove oil droplets from the high velocity air before it is exhausted into the atmosphere.

The use of mineral oil as a permanent paint collecting or eliminating medium provides unexpected and unique benefits not attainable by prior art methods. The paint is not chemically modified by the oil and may be easily separated and reclaimed. The oil is continuously recirculated through the system, which allows for self-cleaning of the booth interior and prevents adherence of paint on any exposed surface, and the self-contained oil circulation system eliminates pollution problems. The baffle arrangement provides for a uniform high velocity flow of air through the working area of the booth without stripping the oil from the baffles.

The benefits herein recited are unexpected because both oil and paint mist are combustible materials, and it would be expected that the combination of the two would be unacceptable because of the possible fire hazard.

Unexpectedly, for reasons explained in detail herein, the combination of mineral oil and paint mist in a spray booth does not result in a flammable mixture at normal or above normal operating temperatures. The high rate of air flow through the booth prevents absorption of the volatile and highly flammable paint components into the thin film of oil, whereas the paint solids are entrained in the oil in a highly efficient manner. The entrained paint solids are thus coated with non-flammable mineral oil and tend to collect in a harmless manner at the bottom of the oil reservoir.

THE DRAWINGS

FIG. 2 is a vertical sectional view taken substantially on line 2—2 of FIG. 1;

DESCRIPTION OF THE PREFERRED EMBODIMENT

Figure 1:
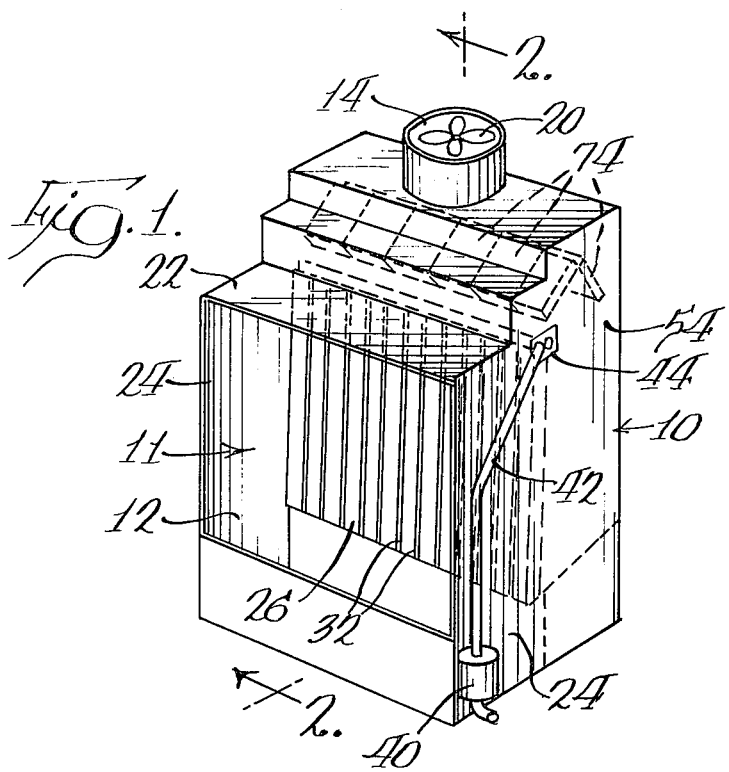
FIG. 1 is a perspective view of a simplified form of spray booth, which incorporates features of the present invention.

FIGS. 1 and 2 illustrate a spray booth 10 having a forwardly extending sheet metal enclosure defining a spray painting or working area 11 and an air intake opening 12 at one side thereof, and a rearwardly disposed exhaust outlet 14 at the top. Objects to be spray painted, such as indicated at 16, are supported in the working area 11 inwardly of the opening 12, and a spray of paint or coating material is directed toward the objects by use of a spray device, such as shown schematically at 18. The paint may comprise any number of the known coating materials, including but not limited to water and solvent based materials, such as alkyds, nitrocellulose laquers, water base enamels, polyurethanes and epoxy resins.

Means are provided for forcibly drawing air horizontally through the inlet opening 12 and vertically up and out through the exhaust outlet 14 in substantially an L-pattern, such as a power driven fan 20 located in the exhaust outlet. Excess paint mist and paint overspray at the inlet is thus drawn into the interior of the spray booth by a high velocity air flow.

The working area leads rearwardly to the solids eliminator portion of the spray booth or baffle section and is surrounded by a top wall 22 and side walls 24. Spaced rearwardly from the working area are a plurality of rows of baffle plates 26, 28 and 30, the first row of plates 26 in effect constituting the rear wall of the working area. In general, the rows of baffle plates are arranged in a parallel relationship, and each row comprises a plurality of spaced, generally vertical members rigidly supported by their ends in a fixed position.

Figure 3:
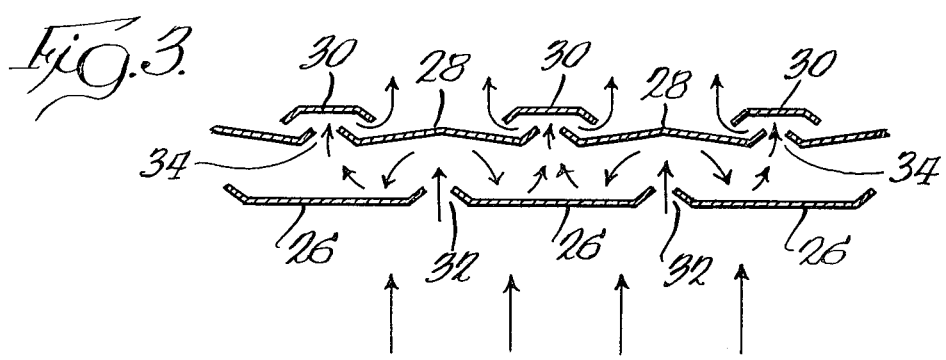
FIG. 3 is a sectional view taken along line 3—3 of FIG. 2.

The baffle plates 26 comprising the outermost row, as shown in FIGS. 2 and 3 are substantially flat and are arranged substantially in a common plane which is substantially perpendicular to the direction of air flow at the inlet, as indicated schematically by the arrows. Adjacent plates are spaced from one another to define narrow open vertical slots 32 therebetween. The baffles are from about four to about seven times wider than the width of the slots, and the side edges thereof are bent rearwardly on an obtuse angle for reasons hereinafter more fully described.

The second set of baffle plates 28 are similar to the first set in terms of width and spacing from each other, except said plates are slightly V-shaped or concave relative to the direction of air flow, with the side edges being bent rearward on an obtuse angle. The longitudinal centerline of the second set of plates 28 coincides with the transverse centerlines of the slots 32 whereby the first and second rows of baffles are arranged in a staggered relationship.

The third row of plates 30 are relatively narrower than the plates of the first two rows and are located behind and are coextensive with the vertical slots 34 between the plates of the second row. The side edges of the plates are bent forwardly, and the space between the third and second rows is less than the space between the first and second rows. The described spacing causes a progressive increase in velocity of air passing through successive rows of baffles.

It will be noted that the respecitve second and third rows of baffles 28 and 30 are not entirely vertically coextensive with the first row 26; instead, the former are shorter than the first row and are suspended in a spaced relationship from a solid or non-permeable web 36 extending downward and supported from the top of the enclosure in parallel with the first row of baffles. Preferably, the length of the web 36 is about one-third of the length of the first row of baffle plates 26. The web 36 serves to alter the normal rate of air flow from the top to bottom of the first two rows of baffle plates, such that the flow is equalized or uniform from top to bottom of the plates and no area of the plates will be subjected to an excessively high flow that would strip the oil therefrom.

The rows of baffle plates are arranged in a spaced staggered relationship to provide for successive positive and at least right angle deflection of any paint and oil particles which emerge through the first group of vertical slots 32, and the final row of baffle plates 30 serve as collectors of oil and solids particles which may be carried through the downstream passages by the high velocity air flow. The air velocity is also rapidly increased up to the final row of baffles in order to increase the straight line momentum of any oil particles, which would otherwise tend to move in a tortuous path with the air flow around the baffles instead of collecting on the final row of baffles as desired.

Means are provided for establishing a continuous and uniform flow of oil down from the front surfaces of the first and second rows of baffle plates, 26 and 28 respectively. A reservoir 38 of mineral oil is provided in the bottom of the enclosure, and is connected, via a suitable pump 40 and line 42, to the top of the enclosure. The line 42 is connected to a bifurcated branch 44 leading into respective troughs 46 and 48 located respectively over and coextensive with the first and second rows of baffle plates 26 and 28. The troughs 46 and 48 have lowered forward edges which allow the oil to spill over and down the front surfaces of the first row of baffle plates 26 and web 36.

Figure 4:
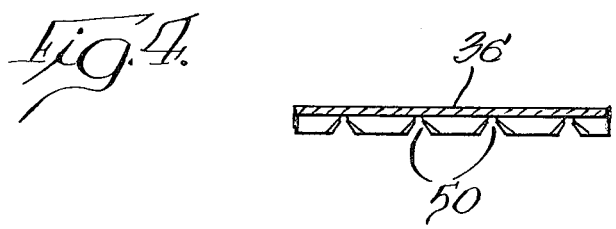
FIG. 4 is a sectional view taken along line 4—4 of FIG. 2.

As shown in FIG. 4, the lower edge portion of the web 36 is provided with a spaced series of V-shaped channels 50 located above respective individual baffle plates of the second row 28. The channels 50 serve to funnel or concentrate the oil moving downward on the web into the central portion of the front surfaces of baffles 28, which has been found to minimize stripping and loss of oil by the air flow as the oil moves down the baffles. The third row of baffle plates 28 are not directly supplied with oil and are supported by a bracket 51 secured to the rear side of the web 36.

The lower ends of the front baffles 26 are connected to a substantially horizontal drain board 52 spaced slightly above the oil level in the reservoir 38, such that the paint laden oil falls a short distance into the reservoir, which has been found to minimize splashing and build-up of paint scum on the surface of the oil reservoir. The mere draining of oil onto the surface of the reservoir may allow the paint solids to float and cling together, whereas a slight drop allows for penetration of the surface. The lower edges of the rear baffles 28 and 30 are spaced above the reservoir oil level to provide the same effect.

It will be noted that the baffles 26, 28 and 30 are preferably inclined downward and outward on a slight vertical angle, preferably in the order of 3° to 4° and no greater than 5°, in order to enhance the continuity of oil flow thereon. An angle greater than 5° from vertical is not desirable due to the tendency of the baffle edges to lose their oil coating.

Important features of the baffle system include the substantial width or frontal surface area of the baffles in comparison to the width of the air passage slots therebetween, and the arrangement of the baffles in a plane which is substantially perpendicular to the path of air flow through the booth. These features allow for a maximum exposure of the moving films of oil to the contaminated air. Also, the planar or slightly concave quality of the baffles, together with the uniform spacing of the air slots therebetween, permits a very high air flow thereover without the oil being wiped from the surface, which would allow the undesirable accumulation of paint on the bare surfaces. The baffles are free from sharp corners, or corners which are less than 90°, because sharp corners would be wiped clean of oil by the high velocity air, especially in the vicinity of the slots. Hence, the baffle design described herein is particularly adapted to present large and efficient oil coated surfaces which retain their oil coating under conditions of high velocity air flow, which, at the first set of baffles may be 125 linear feet per minute and at the second set of baffles, in the order of 2300 linear feet per minute.

Another important feature in the design of the baffle system is the existance of a substantially uniform air flow from top to bottom and from side to side in the inlet opening. In contrast with a water wash booth having a relatively small waterfall area and high resistance to air flow, the present baffle system offers relatively low resistance to air flow due to the length of the slit openings and spacing of the baffle rows, thus allowing the use of a relatively low horsepower motor.

As shown in FIG. 2, located rearwardly or downstream of the first baffle system is a second baffle system, the primary purpose of which is to collect and remove oil particles which escape from the first baffle system. Whereas the first baffle system is arranged in substantially a vertical plane, the second system is arranged horizontally in a vertical exhaust chamber 54 upstream from the exhaust outlet 14. The chamber 54 comprises a forward vertical wall 56 spaced rearwardly from the first baffle system, which extends downward from the top of the enclosure and terminates at a location above a forwardly sloping base 58 and below the tops of the rear baffles 28 and 30, preferably at a point approximately at the horizontal center line of said baffles. As shown by the arrows indicating air flow, air entering at the top of the first set of baffles is swept downward around the wall 56 and then upward into the vertical chamber 54.

As shown, the second baffle system comprises, at the lower entrance of the chamber 54, a first pair of upwardly converging baffles 60 connected to opposite chamber walls by respective horizontal portions 62 having covered openings 64 therein to collect and drain away accumulated oil. The respective end edges of the baffles 60 are supported upon rods 66, said edges having a relatively wide space therebetween to channel and concentrate air flowing therethrough.

A deflecting baffle 68 supported on rods is provided upstream from and in the outlet path of the converging baffles 60. The baffle 68 comprises a horizontal portion which is wider than the outlet of baffles 60 and is connected to opposite legs 70, which are disposed in a downward obtuse angle from the horizontal portion, the ends of said legs being spaced outward from and about on the same level as the ends of the baffles 60. The legs 70 are spaced from the sides of the chamber 54, and air is caused to flow in a tortuous path around the legs, causing oil to accumulate thereon and fall downward onto horizontal portions 62.

A pair of downwardly angled baffles 72 are connected from the chamber walls above the legs 70 of the deflecting baffle 68. The baffles 72 are substantially planar and have terminal edges which extend over the juncture between the legs 70 and the horizontal portion of baffle 68. Thus, the baffles 72 are disposed in the path of the air which emerges around the baffle 68 and serve to further deflect the air flow toward the top of the underlying baffle 68.

Disposed above baffles 72 are a pair of permeable air filters 74 arranged in an inverted V-configuration. The filters 74 may be composed of a mesh material composed of metal, glass fibers, or the like, supported in a frame. The filters 74 serve to remove the final finite traces of the oil before the air reaches the exhaust outlet 14.

The type of oil employed is preferably a mineral oil without detergents or other additives, and having a viscosity to easily flow down the baffles at room temperature without undue vaporization. A mineral oil having a viscosity of 660 Standard Saybolt Units at 100°F have been found to be suitable, although other viscosities may be employed. A suitable flow rate is approximately 8 gallons per minute for each foot of width of baffles, and the reservoir preferably contains at least about 25 gallons per foot of baffle width, to provide sufficient volume for settling of the paint solids.

Mineral oil offers several advantages, including a high flash point and burning point, and is incompatible and chemically unreactive with paint solids in current use. Because the oil has a lower density than the paint solids, the solids tend to settle to the bottom of the reservoir where they may be removed. Moreover, the flammable volatile solvent components of the paint are not absorbed by the oil and do not lower the flash point or burning point thereof. The presence of paint solids which may remain entrained in the circulating oil do not substantially affect the efficiency of the eliminator baffles.

In operation, the fan 20 and oil pump 40 are activated, such that oil is pumped from the reservoir 38 upward through the line 42 into the troughs 46 and 48. A continuous supply of oil flows down over the first and second rows of baffles, 26 and 28, and air is drawn through the inlet opening 12 at a rate of at least 60 linear feet per minute and preferably in excess of 100 linear feet per minute.

With the booth in readiness, objects, such as inidicated at 16, are disposed in or near the opening 12, and the paint spray device 18 is located upstream of the object and is aimed at the object.

Atomized paint which does not adhere to the object 16 is carried by the high air flow into contact with the first baffles 26, which are entirely covered with a continuously moving film of oil. As a result, the solid paint particles are entrained in the oil and flow downward into the reservoir 38, where the paint solids are allowed to settle. Paint particles which avoid the first baffles 26 and pass through the air slots 32 increase in momentum and are deposited on the second set of baffles 28, and any particles passing the baffles 28 through the slots 34 are collected by the baffles 30, which are normally wetted by oil removed from the first two rows of baffles.

After the air has passed through the eliminator baffles, it passes under the barrier wall 56 and moves upwardly in the chamber 54, thereby encouraging elimination of oil mist by gravity forces. Also, the chamber 54 presents a relatively larger volume than the volume near the eliminator baffles, which causes a reduction in air velocity and decreases the ability of the air to carry any residual oil.

The air is deflected off the successive baffles 60, 68 and 72 such that virtually all residual oil is removed from the air and is returned to the reservoir. The filters 74 serve as a final precaution to the escape of the minute particles into the air.

After the booth has been used over a period of time, the paint solids which have collected in the bottom of the reservoir may be removed and reclaimed.

In comparison to other known spray booths, the spray booth offers the following advantages: very low emission of particulates into the atmosphere since the booth will normally operate at 99 or 100% efficiency; easy collection and reclaimation of coating material solids and ability to accommodate a greater variety of coatings; easier cleaning of booth and no corrosion of booth materials; quieter operation and uniform air velocity at face; less electrical power required; and various other advantages mentioned hereinbefore.

What is claimed is:

1. A paint spray booth comprising, in combination, an enclosure having side and top walls defining therein a spray painting chamber, an air inlet in one side of said chamber and an air outlet in the other side of said chamber, means for drawing air through said inlet and said chamber and discharging it through said outlet, substantially vertical wall means in said enclosure between said chamber and said outlet extending from side wall to side wall and from top to bottom thereof, said vertical wall means including a plurality of longitudinally spaced sets of vertically extending laterally spaced baffle plates, the baffles plates of the first set having broad front faces exposed to said chamber and forming a rear wall for said chamber against which spray painting operations may be performed, the baffles of said first set being mounted closely adjacent to define narrow vertical slits between said plates for escape of air from said chamber, the baffle plates of each succeeding set being staggered relative to the plates of the preceding set with each plate of each succeeding set being aligned with and laterally broader than a respective one of the spaces between the plates of the preceding set and spaced slightly rearwardly therefrom as to cause air passing through said sets of plates to be diverted into tortuous paths around the plates of each set, the sets of baffle plates succeeding said first set being shorter than the first set and suspended therebehind by an imperforate web coextensive with the upper portions of the baffle plates of the first set, said web equalizing the greater air flow over and through said first set of baffle plates and thus throughout said chamber, an oil reservoir in said enclosure beneath said baffle plates, oil in said reservoir the level in which is spaced below the lower ends of said baffle plates, means between the lower ends of said baffle plates and the oil in said reservoir for preventing passage of air below said baffle plates and for constraining the air to pass through said sets of baffle plates, means for continuously pumping oil from said reservoir to the upper ends of the baffle plates of at least the first and second sets and for gravitationally flowing a film of oil uniformly over the front faces of the baffle plates of the first and second sets, whereby particles of paint sprayed against the baffle plates of the first set and carried in the air passage through the slits between the baffle plates of the first set are entrained in the oil and flushed thereby into the reservoir, the oil flowing over said baffle plates being returned to said reservoir and having a free fall from the lower edges of said baffle plates to the level of the oil in the reservoir whereby to cause the entrained paint particles to penetrate the surface of the oil and become immersed therein and to sink to the bottom on the reservoir, the baffle plates of the first set having the side edges thereof bent rearwardly toward the baffle plates of said second set and the baffle plates of said second set having a central concave portion for catching and retaining oil and paint particles passing thereto from the preceding set of plates, the baffle plates of the last set each having the side edges thereof bent forwardly into spaced generally parallel relation with the side edges of the respective plates of the preceding set for catching and retaining oil and paint particles passing thereto from the preceding set, whereby the paint particles are entrained in the oil and deposited in the reservoir and air substantially free of paint and oil particles is delivered to said outlet, and a second baffle system in said enclosure between the last set of said baffle plates and said outlet, said second baffle system comprising a vertical chamber rearwardly of said last set of baffle plates extending from sidewall to sidewall of said enclosure and including a vertical wall spaced rearwardly from said last set of baffle plates and terminating at its lower edge in upwardly spaced relation to the lower ends of said baffle plates to define an entrance into the lower end of said vertical chamber, a pair of laterally spaced baffles converging upwardly from the walls of said vertical chamber above said entrance, and a horizontal deflecting baffle mounted centrally in said vertical chamber above the upper ends of said converging baffles, said horizontal baffle being wider than the space between the upper ends of said converging baffles and having side edges bent downwardly into spaced generally parallel overlying relation with an adjacent one of said converging baffles, said baffles in said vertical chamber causing the air passing therethrough to strike several baffle surfaces and to travel in a tortuous path having several sharp turns therein for removing substantially all traces of paint and oil from the air, said vertical chamber having a bottom wall sloping toward said reservoir for returning to the reservoir all oil removed from the air.

2. A paint spray booth as set forth in claim 1, wherein the succeeding sets of baffle plates are at least two in number and wherein the longitudinal spacing between successive sets of baffle plates is progressively smaller so as to cause a progressive increase in the velocity of the air passing through the successive rows of the baffles plates to increase the air scouring action thereof.

3. A paint spray booth as set forth in claim 1, wherein said means for pumping oil from said reservoir to the upper end of said baffle plates includes header means at the upper end of said first set of baffle plates and header means at the upper edge of said imperforate web, the lower edge of said web being provided with a spaced series of channels located above the central concave portion of each respective baffle plate of the second row to funnel a flow of oil onto the front surface of the central portion of each of the baffle plates in the second row.

4. A paint spray booth as set forth in claim 1, wherein said second baffle system includes a pair of laterally spaced baffles converging downwardly from the walls of said vertical chamber above said horizontal baffle, the lower ends of said downwardly converging baffles being spaced above said horizontal baffle and having terminal edges which extend over the juncture between said horizontal baffle and the downwardly bent side edges thereof, and permeable air filter means above said downwardly converging baffles for removing the last finite traces of oil from the air.

5. A paint spray booth comprising, in combination an enclosure having side and top walls defining therein a spray painting chamber, an air inlet in one side of said chamber and an air outlet in the other side of said chamber, means for drawing air through said inlet and said chamber and discharging it through said outlet, substantially vertical wall means in said enclosure between said chamber and said outlet extending from side wall to side wall and from top to bottom thereof, said vertical wall means including a plurality of longitudinally spaced sets of vertically extending laterally spaced baffles plates, the baffles plates of the first set having broad front faces exposed to said chamber and forming a rear wall for said chamber against which spray painting operations may be performed, the baffle plates of said first set being mounted closely adjacent to define narrow vertical slits between said plates for escape of air from said chamber, the baffle plates of each succeeding set being staggered relative to the plates of the preceding set with each plate of each succeeding set being aligned with and laterally broader than the respective one of the spaces between the plates of the preceding set and spaced slightly rearwardly therefrom so as to cause air passing through said sets of plates to be diverted into tortuous paths around the plates of each set, an oil reservoir in said enclosure beneath said baffle plates, oil in said reservoir the level of which is spaced below the lower ends of said baffle plates, means between the lower ends of said baffle plates and the oil in said reservoir for preventing passage of air below said baffle plates and for constraining the air to pass through said sets of baffles plates, means for pumping oil from said reservoir to the upper ends of the baffle plates of at least the first and second sets for gravitationally flowing a flim of oil uniformly over the front faces of the baffle plates of the first and second sets, whereby particles of paint sprayed against the baffle plates of the first set and carried in the air passage through the slits between the baffle plates of the first set are entrained in the oil and flushed thereby into the reservoir, the baffle plates of the first set having the broad front faces thereof in substantially a common plane and having the side edges thereof bent rearwardly toward the baffle plates of said second set, the baffle plates of said second set having a central concave portion aligned with the slits between the baffle plates of the first set for receiving the flowing film of oil and for catching and retaining oil and paint particles passing thereto from said first set of plates, and a third set of baffle plates rearwardly of said second set to which oil is not supplied, the baffle plates of said third set having the side edges thereof bent forwardly into spaced generally parallel relation with the side edges of the respective plates of the second set for catching and retaining oil and paint particles passing thereto from said second set, the longitudinal spacing between successive sets of baffle plates being progressively smaller so as to cause a progressive increase in the velocity of the air passing through the successive rows of the baffle plates to increase the air scouring action threreof, the spacing of said baffle plates above the oil level causing the oil flowing over said baffle plates to be returned to said reservoir with a free fall from the lower edges of said baffle plates to the level of the oil in the reservoir whereby to cause the entrained particles to penetrate the surface of the oil and become immersed therein to sink to the bottom of the reservoir.

6. A paint spray booth as set forth in claim 5, wherein the sets of baffle plates succeeding said first set are shorter than the first set and are suspended therebehind by an inperforate web co-extensive with the upper portions of the baffle plates of the first set.

7. A paint spray booth as set forth in claim 5, including a second baffle system in said enclosure between the last set of said baffle plates and said outlet, said second baffle system comprising a vertical chamber rearwardly of said last set of baffle plates and having an entrance into the lower end thereof, means in said vertical chamber immediately above said entrance for causing the air entering through said entrance to be converged upon itself generally centrally of said vertical chamber, and a horizontal deflecting baffle mounted centrally in said vertical chamber above said converging means and having side edges bent downwardly laterally outwardly from said converging means, said converging means and said horizontal baffle causing the air passing through said vertical chamber to strike said baffle and to travel in a tortuous path having several sharp turns therein for removing substantially all traces of oil from the air.

8. A paint spray booth comprising, in combination, an enclosure having side and top walls defining therein a spray painting chamber, an air inlet in one side of said chamber and an air outlet in the other side of said chamber, means for drawing air through said inlet and said chamber and discharging it through said outlet, substantially vertical wall means in said enclosure between said chamber and said outlet extending from sidewall to sidewall and from top to bottom thereof, said vertical wall means including a plurality of longitudinally spaced sets of vertically extending laterally spaced baffle plates, the baffle plates of the first set having broad front faces exposed to said chamber and forming a rear wall for said chamber against which spray painting operations may be performed, the baffle plates of said first set being mounted closely adjacent to define narrow vertical slits between said plates for escape of air from said chamber, the baffle plates of each succeeding set being staggered relative to the plates of the preceding set with each plate of each succeeding set being aligned with and laterally broader than a respective one of the spaces between the plates of the preceding set and spaced slightly rearwardly therefrom so as to cause air passing through said sets of plates to be diverted into tortuous paths around the plates of each set, the sets of baffle plates succeeding said first set being shorter than the first set and suspended therebehind by an imperforate web coextensive with the upper protions of the baffle plates of the first set, an oil reservoir in said enclosure beneath said baffle plates, oil in said reservoir, means for pumping oil from said reservoir to the upper ends of the baffle plates of at least the first and second sets for gravitationally flowing a film of oil uniformly over the front faces of the baffle plates of the first and second sets, whereby particles of paint sprayed against the baffle plates of the first set and carried in the air passing through the slits between the baffle plates of the first set are entrained in the oil and flushed thereby into the reservoir, the oil flowing over said baffle plates being returned to said reservoir for recirculation over said plates.

9. A paint spray booth as set forth in claim 8, wherein the oil is pumped from the reservoir to the upper ends of the baffle plates of the first set and to the upper edge of said imperforate web, whereby oil is flowed downwardly over the front faces of the baffle plates of the first set, the front face of said imperforate web and the front faces of the baffle plates of the second set, the lower edge of said imperforate web being provided with a spaced series of channels located above the central portion of each of the respective individual baffle plates of the second set to funnel a flow of oil into the central portion of the front surface of each of the baffles of the second set.

10. A paint spray booth as set forth in claim 9, wherein the baffle plates of the first set have the side edges thereof bent rearwardly toward the baffle plates of said second set, the baffle plates of said second set have a central concave portion aligned with the slits between the baffle plates of the first set for receiving the flow of oil from said imperforate web and for catching and retaining oil and paint particles passing thereto from said first set of plates, and a third set of baffle plates rearwardly of said second set to which oil is not supplied, the baffle plates of said third set having the side edges thereof bent forwardly into spaced generally parallel relation with the side edges of the respective plates of the second set for catching and retaining oil and paint particles passing thereto from said second set.

11. A paint spray booth comprising, in combination, an enclosure having side and top walls defining therein a spray painting chamber, an air inlet in one side of said chamber and an air outlet in the other side of said chamber, means for drawing air through said inlet and said chamber and discharging it through said outlet, means in said enclosure between said chamber and said outlet for removing from the air passing through said chamber the majority of said paint particles resulting from the spray painting operations, and a baffle system between said particle removing means and said outlet for further cleaning the air and removing therefrom substantially all traces of paint, said baffle system comprising a vertical chamber rearwardly of said particle removing means having an entrance into the lower end thereof, means immediately above said entrance for converging the flow of air into the central portion of said vertical chamber at the lower portion thereof, and horizontal deflector means spaced from the sides of said vertical chamber and positioned in said converging air flow immediately above said converging means.

12. A paint spray booth as set forth in claim 11, wherein said converging means comprises a pair of laterally spaced baffles converging upwardly from the walls of said vertical chamber immediately above said entrance, and wherein said deflector means comprises a horizontal baffle mounted centrally in said vertical chamber above the upper ends of said converging baffles, said horizontal baffle being wider than the space between the upper ends of said converging baffles and having side edges bent downwardly into overlying relationship relative to said converging baffles.

13. A paint spray booth as set forth in claim 12, including a pair of laterally spaced baffles converging downwardly from the walls of said vertical chamber above said horizontal baffle, the lower ends of said downwardly converging baffles being spaced above said horizontal baffle and having terminal edges which extend over the juncture between said horizontal baffle and the downwardly bent side edges thereof, and permeable air filter means above said downwardly converging baffles, said baffles causing the air passing through said vertical chamber to strike several baffles and to travel in a tortuous path having several sharp turns therein for removing substantially all traces of paint from the air, said permeable air filter means removing the last finite traces of paint from the air.

* * * * *